United States Patent
Kwon

(10) Patent No.: US 6,983,175 B2
(45) Date of Patent: Jan. 3, 2006

(54) MOBILE STATION

(76) Inventor: Yong Soon Kwon, Chonghan-yeonlib 1-203, 422-1, Ssangmoon-dong, Dobong-ku, Seoul (KR)

( * ) Notice: Subject to any disclaimer, the term of this patent is extended or adjusted under 35 U.S.C. 154(b) by 545 days.

(21) Appl. No.: 10/258,999

(22) PCT Filed: Apr. 24, 2001

(86) PCT No.: PCT/KR01/00683

§ 371 (c)(1),
(2), (4) Date: Oct. 31, 2002

(87) PCT Pub. No.: WO01/84728

PCT Pub. Date: Nov. 8, 2001

(65) Prior Publication Data

US 2004/0203513 A1   Oct. 14, 2004

(30) Foreign Application Priority Data

May  1, 2000 (KR) .......................................... 2000-12457
Aug. 26, 2000 (KR) .......................................... 2000-49945

(51) Int. Cl.
*H04B 1/38* (2006.01)

(52) U.S. Cl. .................. 455/575.1; 455/90.3; 345/168; 345/169; 361/680; 370/433.07

(58) Field of Classification Search ............. 455/575.1, 455/90.3; 345/168, 169; 361/680; 379/733.07
See application file for complete search history.

(56) References Cited

U.S. PATENT DOCUMENTS 5,267,127 A * 11/1993 Pollitt ..................... 361/680
6,157,718 A * 12/2000 Kaschke .................. 455/569.1
6,734,809 B1 * 5/2004 Olodort et al. ............... 341/22
6,748,248 B1 * 6/2004 Pan et al. ................ 455/575.1
2004/0185922 A1 * 9/2004 Sutton et al. ............ 455/575.1
2005/0054393 A1 * 3/2005 Fagerstrom et al. ...... 455/575.1

FOREIGN PATENT DOCUMENTS

| KR | 20-0175892 | 1/2000 |
|----|-----------|--------|
| KR | 20-0182575 | 3/2000 |
| KR | 2000-0041529 | 7/2000 |
| KR | 2001-0028938 | 4/2001 |

* cited by examiner

*Primary Examiner*—Lee Nguyen
(74) *Attorney, Agent, or Firm*—Marshall, Gerstein & Borun LLP

(57) ABSTRACT

Described is a mobile station for receiving/transmitting information of every kind including at least one auxiliary keyboard having a plurality of auxiliary input keys therein, whereby the information is received/transmitted through the auxiliary input keys when a user wants to transmit the information by the mobile station. For that purpose, provided are a main body (1) having a plurality of input keys mounted on an upper surface of the mobile station, a first and second assist keyboards (8 and 9) being folded or unfolded centering around hinge joints, the key boards hinge-jointed rotationally on the opposite portions of both sides of the body (1) to a horizontal direction, respectively, and a plurality of auxiliary input keys (10) and (11) on upper surfaces of the first and second auxiliary keyboards (8) and (9) for inputting characters and numbers when the first and second auxiliary keyboards are unfolded from the body (1).

22 Claims, 11 Drawing Sheets

MOBILE STATION

TECHNICAL FIELD

The present invention relates to a mobile station, and more particularly, to a mobile terminal including a mobile phone, a PDA, an IMT-2000 terminal to which data such as characters, numbers and the like are inputted with ease.

BACKGROUND ART

Mobile communication terminals are generally used as mobile communication field is developed abruptly. Lately, lots of developments have been made to the mobile communication terminals enabling to be used regardless of regions and time/space limitation, whereby demands for the terminals and development of related fields are greatly increased.

Moreover, as mobile terminals are equipped with various functions of receiving/transmitting image information as well as character information for a third generation mobile communication such as IMT-2000 and the like, the sizes of the terminals are greatly reduced. Thus, manufacturers of such mobile terminals have many difficulties in arranging a plurality of input keys for inputting characters and numbers on limited surface areas of the mobile terminals.

Until now, a mobile terminal has the limited number of input keys, to each of which several alphabets, consonants and vowels of Korean Character, and numbers are given, for inputting many numbers and characters. Thus, many difficulties have been found in using the mobile terminal because one of the alphabets, consonants and vowels of Korean Character, and numbers is selected by an input count of the input key (the number of pressings).

Reference will now be made in detail to a mobile terminal according to a related art, an example of which is illustrated in the accompanying drawing of FIG. 1.

Referring to FIG. 1, a mobile terminal according to a related art is mainly divided into a body 1 and a folder 2 of which one end is hinge-jointed to a rear end of the body 1 for providing a rotary moving function. And, the body 1 is constructed with a front panel part 1a and a back panel part 1b which are joined together.

A plurality of input keys 3 including keys for menu selection number/character input and the like are provided on an upper surface of the front panel part 1a.

A microphone 4 for inputting transmitting tones is installed at the upper surface of the front panel part 1a of the body 1, and a battery is coupled detachably with a lower surface of the back panel part 1b to supply the body 1 with electric power. In this case, it is unnecessary for the battery 5 to be coupled with the back panel part 1b. Thus, the battery 5, if necessary, may be coupled with an external surface, i.e. an upper surface of the folder 2.

On an internal surface, i.e. a lower surface of the folder 2, a liquid crystal panel 6 for displaying a variety of information and messages and a speaker (receiver) 7 for outputting a receiving tone are installed respectively.

Considering a not-using state of the above-structured mobile terminal of the related art, the folder 2 of which one end is hinge-jointed to a rear end of the body 1 is closed so as to protect the respective input keys 3 installed on the upper surface of the front panel 1a constructing the body 1.

To use the closed state mobile terminal, as shown in FIG. 1, a user has to rotate the folder 2 by human power to open the above-stated folder 2 of which one end is hinge-jointed to a rear end of the body 1 is closed, Then, some of the input keys 3 lying on the upper surface of the front panel part 1a are selected to use the mobile terminal. In this case, required power supplying is carried out by the battery 5 which is coupled with the body 1 or folder 2.

When a call to the other party is made through a mobile terminal, a send tone is inputted through the microphone 4 installed at the upper surface of the front panel 1a of the body 1 while a receive tone is outputted through the speaker 7 installed at the internal surface, i.e. the lower surface of the folder 2.

Being transacted through the mobile terminal with the other party, the messages are displayed on the liquid crystal panel 6 installed on the internal surface, i.e. the lower surface of the folder 2.

Unfortunately, the mobile terminal according to the related art has the problems as follows.

As the installment area of the input keys for inputting characters and numbers are limited, it is inevitable that several numbers, characters (alphabets or consonants/vowels of Korean Letters), and symbols are given to each of the input keys.

Consequently, the respective input keys are pressed several times to input a specific letter, thereby causing inconvenience to a user as well as time consuming. Especially, a beginner of using the mobile terminal fails to make use of the various functions of the mobile terminal.

DISCLOSURE OF THE INVENTION

Accordingly, the present invention is directed to a mobile terminal that substantially obviates one or more of the problems due to limitations and disadvantages of the related art.

An object of the present invention is to provide a mobile terminal enabling to input characters, numbers and the like with ease using both input keys and auxiliary input keys installed at a body and auxiliary keyboards respectively to use a mobile terminal at which the auxiliary keyboards having a plurality of auxiliary input keys is installed to be selectively folded/unfolded horizontally by rotation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile station according to the present invention includes a body having a plurality of input keys on an upper surface, a first and a second auxiliary keyboards hinge-jointed respectively to both confronting parts of a lower surface of the body so as to rotate to move horizontally wherein entire parts of the first and second auxiliary keyboards are inserted into the body so as to be folded or the rest parts of the first and second auxiliary keyboards except the hinge-jointed parts are drawn out from the body so as to be unfolded, and a plurality of auxiliary input keys on upper surfaces of the first and second auxiliary keyboards so as to input characters, numbers and the like with the input keys of the body when the first and second auxiliary keyboards are unfolded.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
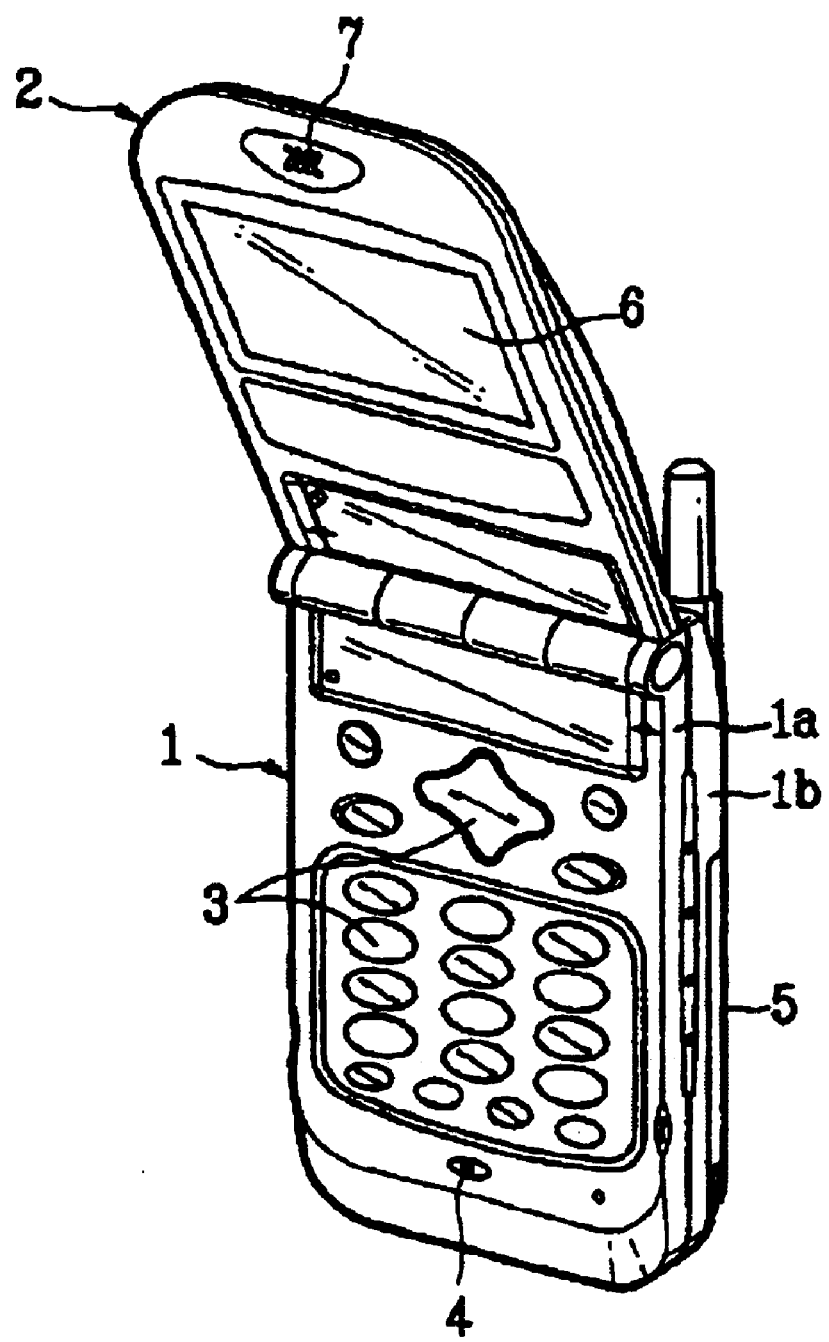
FIG. 1 shows a bird's-eye view of an opened mobile terminal according to a related art.
Figure 2:
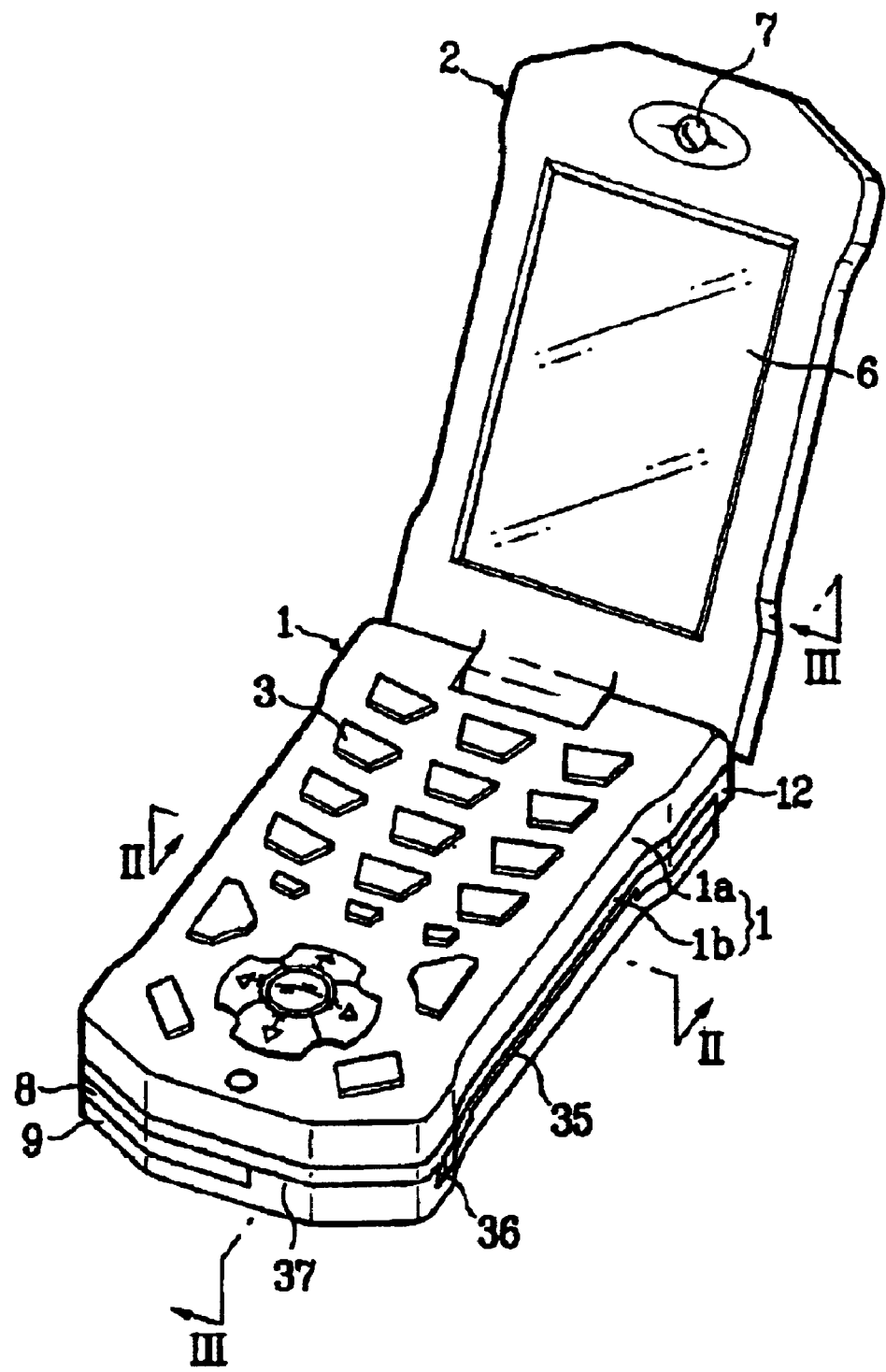
FIG. 2 shows a bird's-eye view of a mobile terminal according to an embodiment of the present invention.
Figure 3:
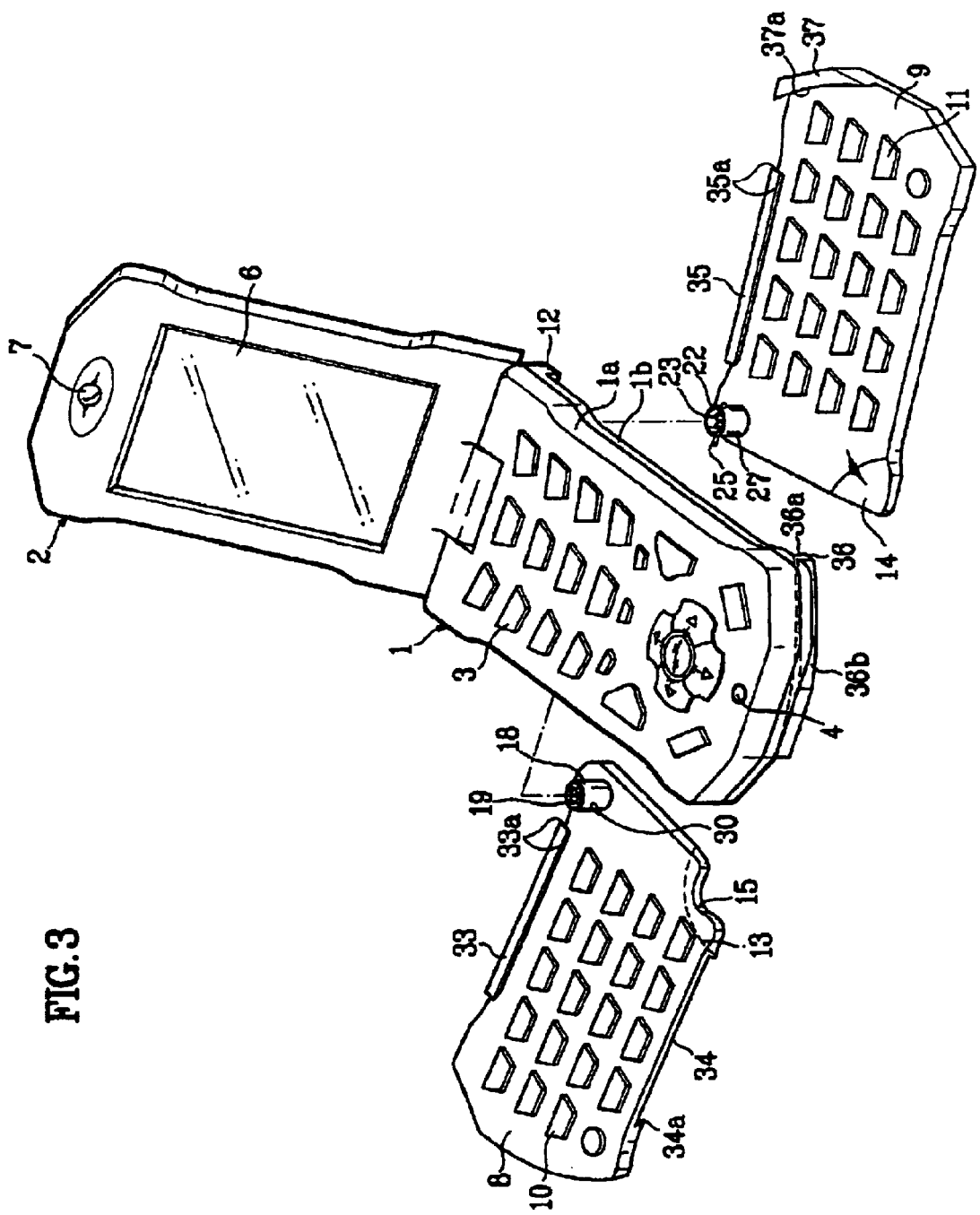
FIG. 3 shows a bird's eye-view of major disassembly parts of a mobile terminal according to an embodiment of the present invention.
Figure 4:
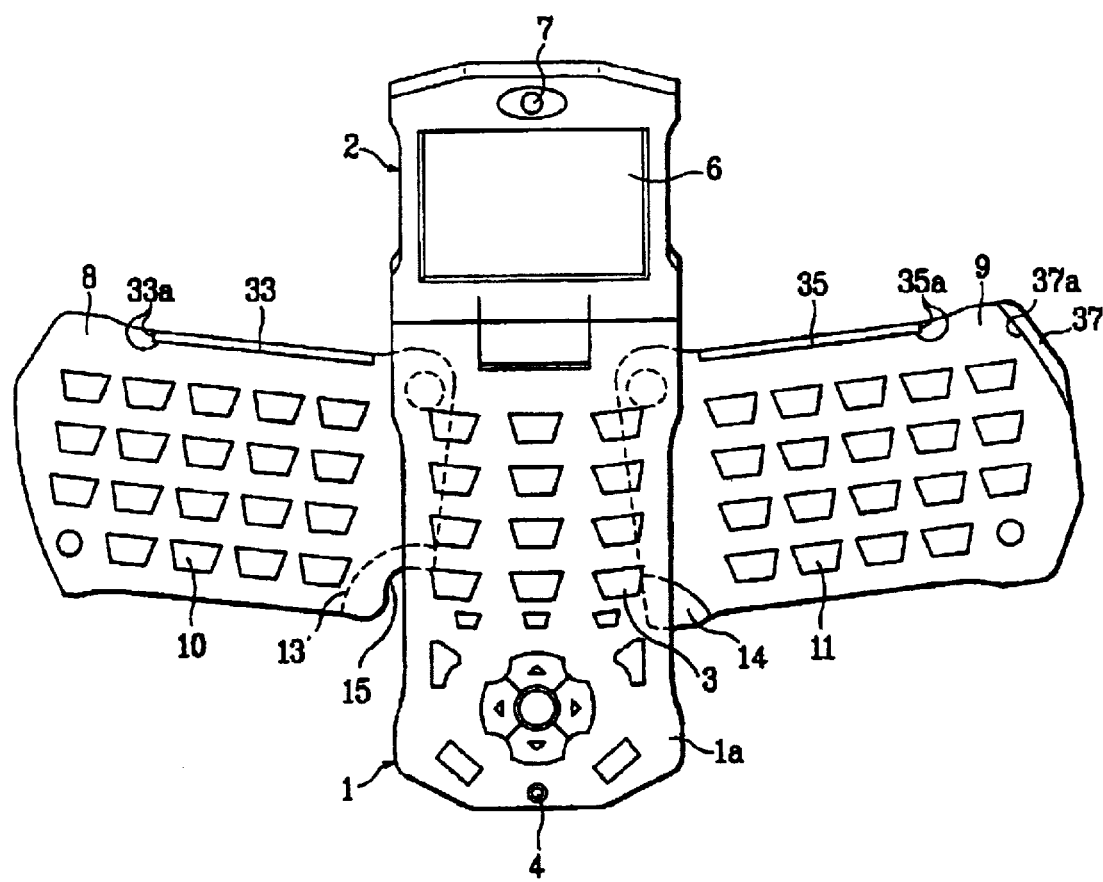
FIG. 4 shows a layout of a mobile terminal according to an embodiment of the present invention, in which a folder is opened and first and second auxiliary keyboards are unfolded completely.

FIG. 2 shows a bird's-eye view of a mobile terminal according to an embodiment of the present invention, FIG. 3 shows a bird's eye-view of major disassembly parts of a mobile terminal according to an embodiment of the present invention, and FIG. 4 shows a layout of a mobile terminal according to an embodiment of the present invention wherein a folder is opened and first and second auxiliary keyboards are unfolded completely.

Figure 5A:
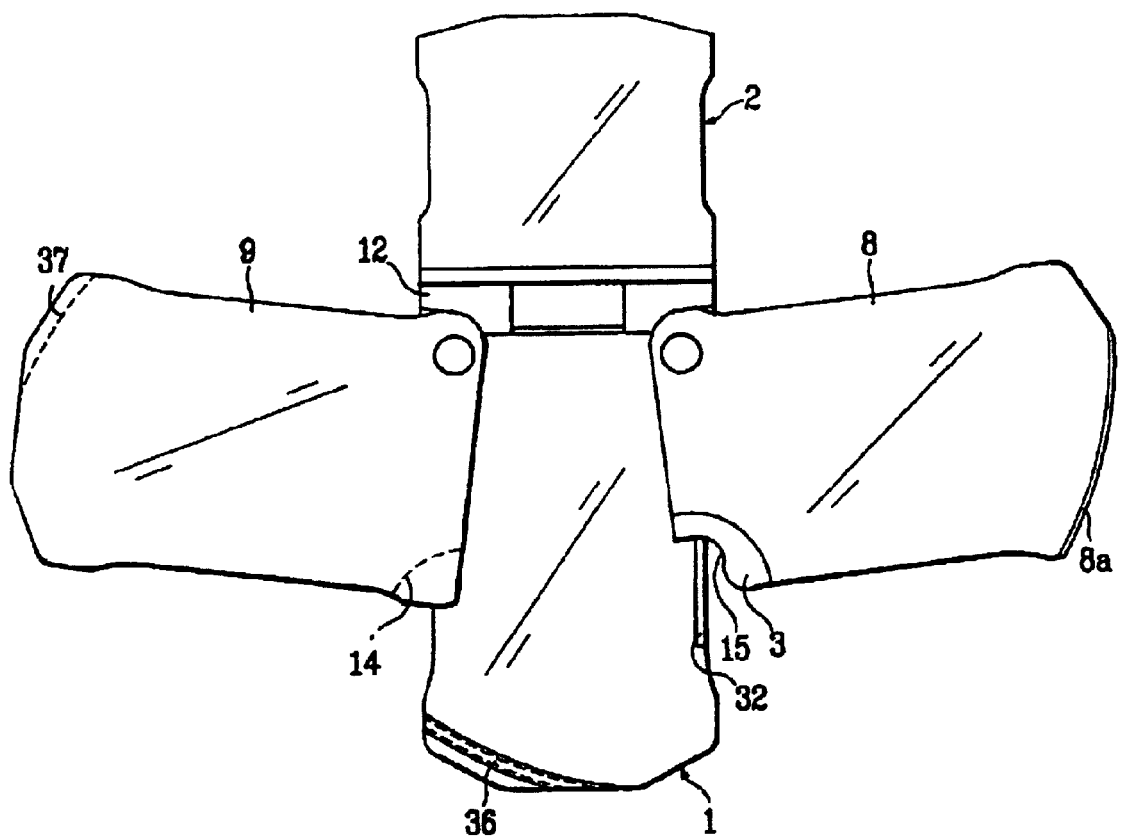
FIG. 5A shows a rear view of a mobile terminal according to an embodiment of the present invention, in which a folder is opened and first and second auxiliary keyboards are unfolded completely.
Figure 5B:
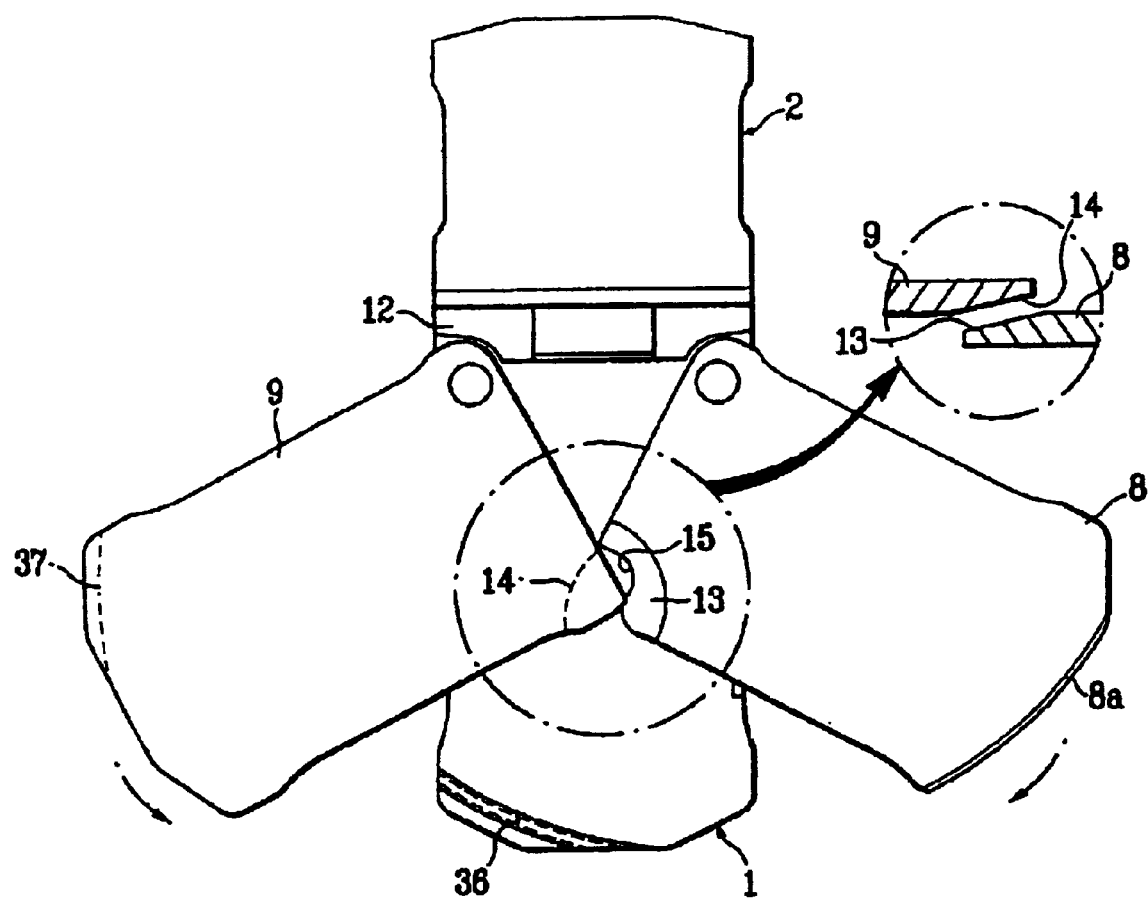
FIG. 5B shows a rear view of a mobile terminal according to an embodiment of the present invention in which a folder is opened and first and second auxiliary keyboards are being folded.
Figure 5C:
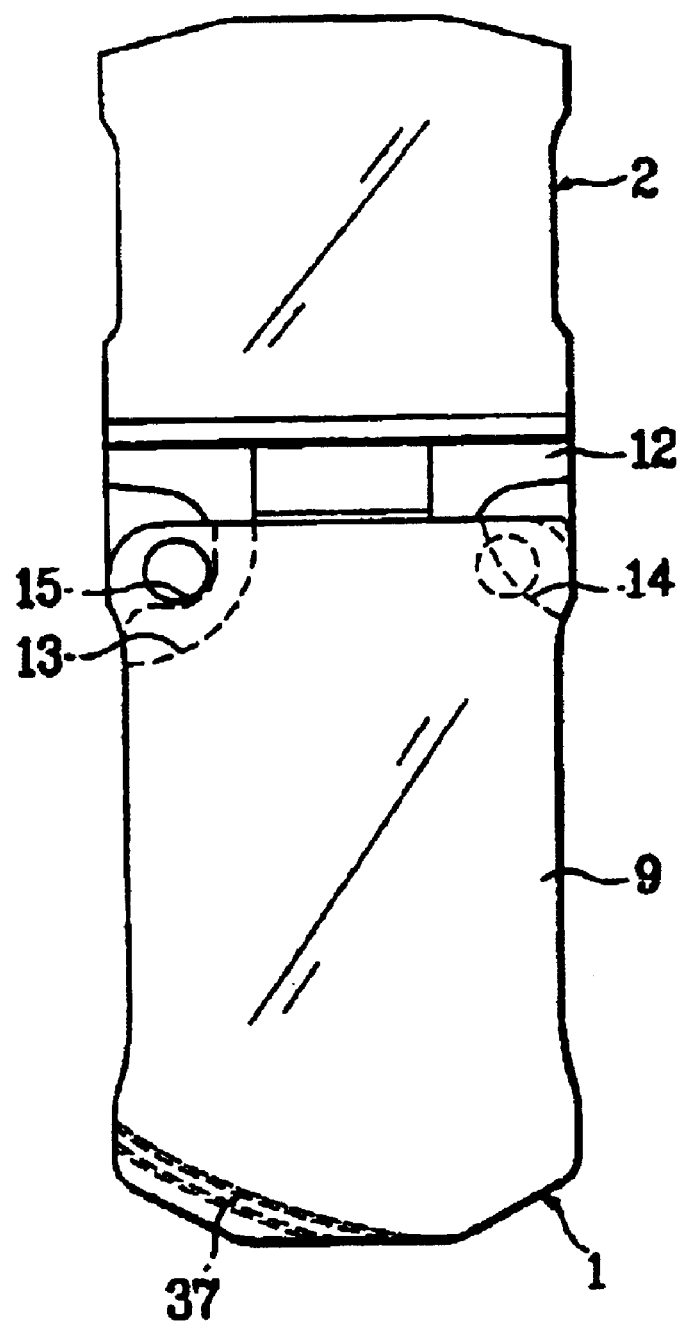
FIG. 5C shows a rear view of a mobile terminal according to an embodiment of the present invention, in which a folder is opened and first and second auxiliary keyboards are folded completely.
Figure 6:
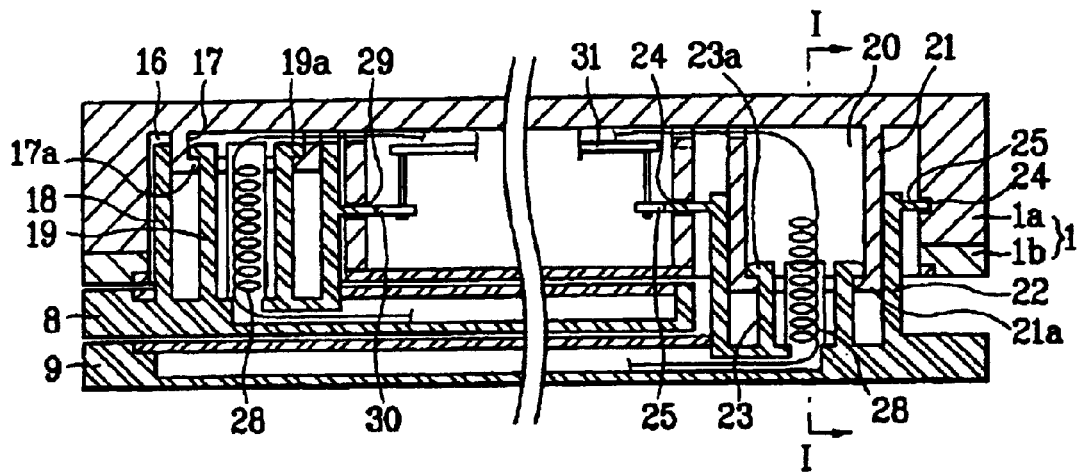
FIG. 6 shows a vertical cross-sectional view of major parts of a mobile terminal according to an embodiment of the present invention, in which first and second auxiliary keyboards hinge-jointed to a body are completely folded.
Figure 7A:
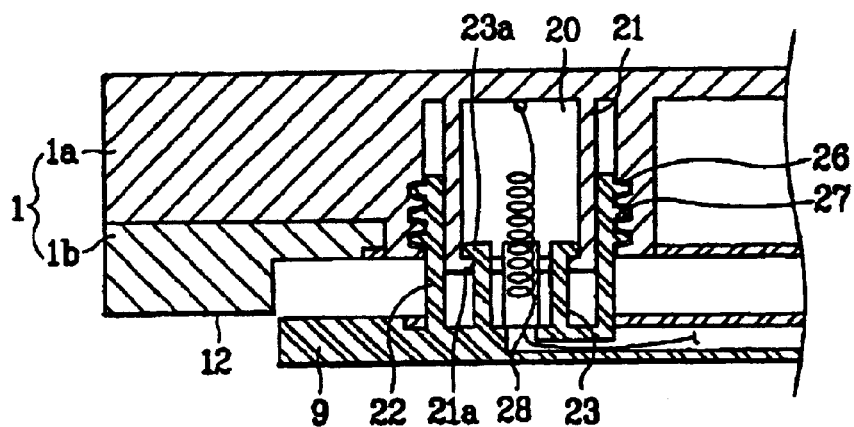
FIG. 7A shows a cross-sectional view taken along a line I—I in FIG. 6, in which a second auxiliary keyboard is about to move upward to a direction of a body.
Figure 7B:
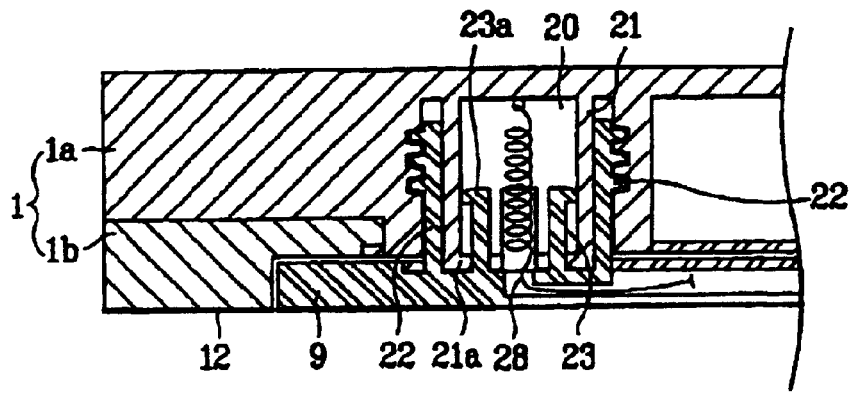
FIG. 7B shows a cross-sectional view taken along a line I—I in FIG. 6, in which a second auxiliary keyboard has moved upward to a direction of a body.
Figure 8:
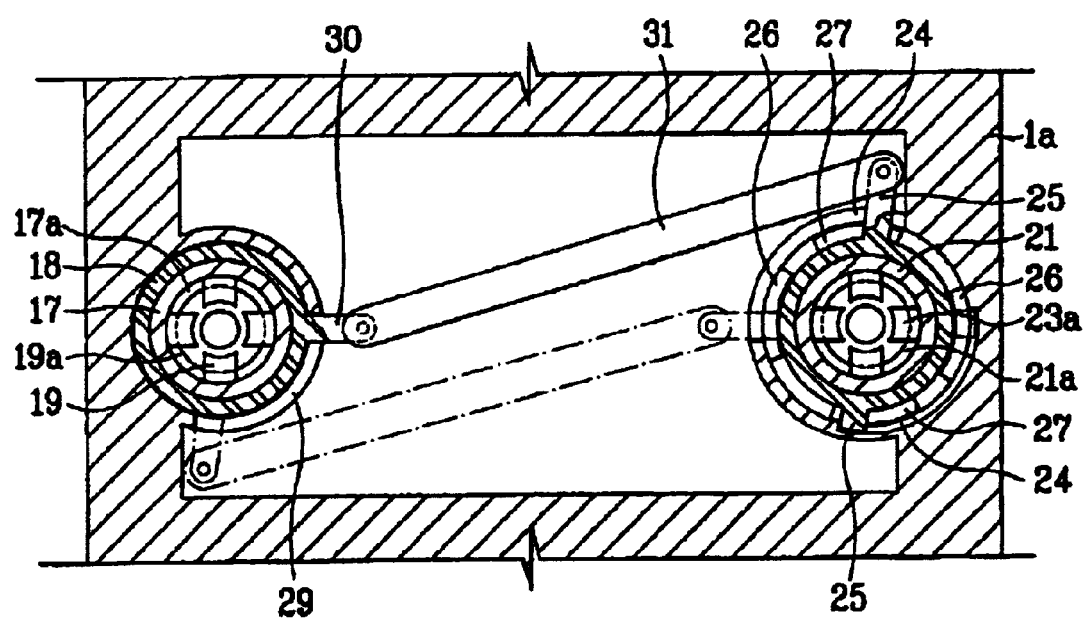
FIG. 8 shows a horizontal cross-sectional view of major parts of a mobile terminal according to an embodiment of the present invention.

FIG. 5A shows a rear view of a mobile terminal according to an embodiment of the present invention wherein a folder is opened and first and second auxiliary keyboards are unfolded completely, FIG. 5B shows a rear view of a mobile terminal according to an embodiment of the present invention wherein a folder is opened and first and second auxiliary keyboards are being folded, FIG. 5C shows a rear view of a mobile terminal according to an embodiment of the present invention wherein a folder is opened and first and second auxiliary keyboards are folded completely, FIG. 6 shows a vertical cross-sectional view of major parts of a mobile terminal according to an embodiment of the present invention wherein first and second auxiliary keyboards hinge-jointed to a body are completely folded, FIG. 7A shows a cross-sectional view taken along a line I—I in FIG. 6 wherein a second auxiliary keyboard is about to move upward to a direction of a body, FIG. 7B shows a cross-sectional view taken along a line I—I in FIG. 6 wherein a second auxiliary keyboard has moved upward to a direction of a body, and FIG. 8 shows a horizontal cross-sectional view of major parts of a mobile terminal according to an embodiment of the present invention.

Figure 9:
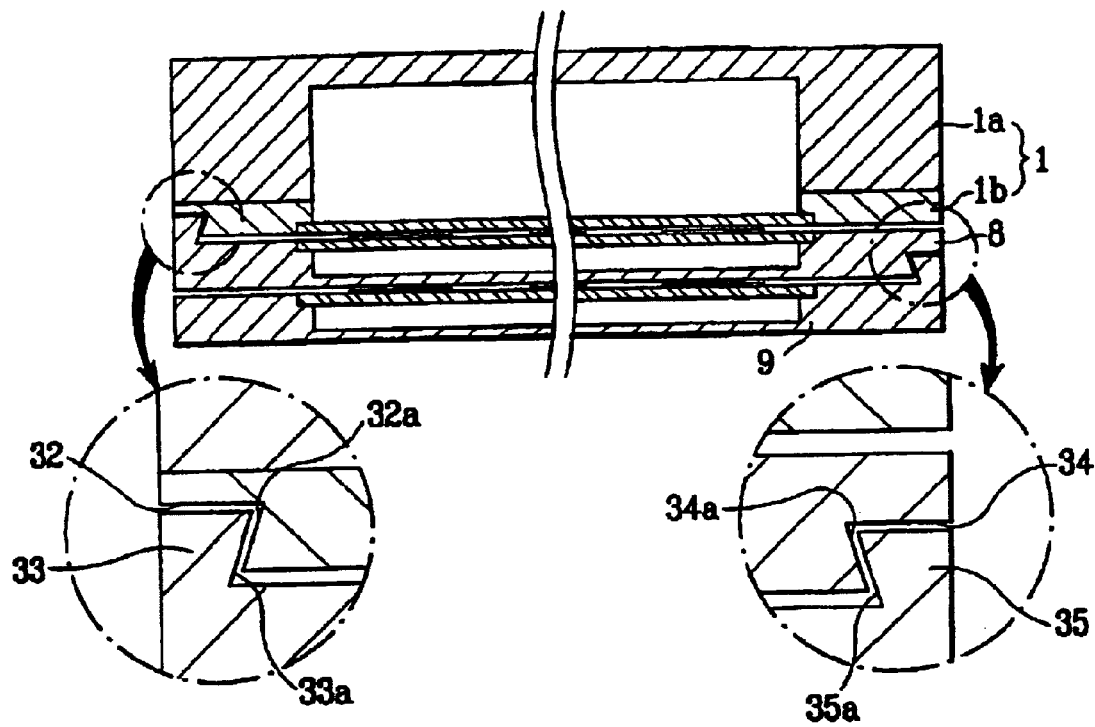
FIG. 9 shows a cross-sectional view of major parts taken along a line II—II in FIG. 2.
Figure 10:
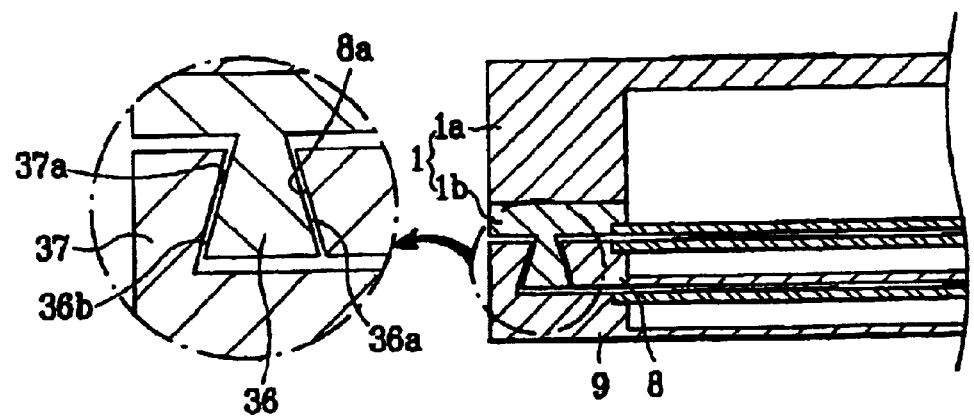
FIG. 10 shows a cross-sectional view of major parts taken along a line III—III in FIG. 2.
Figure 11:
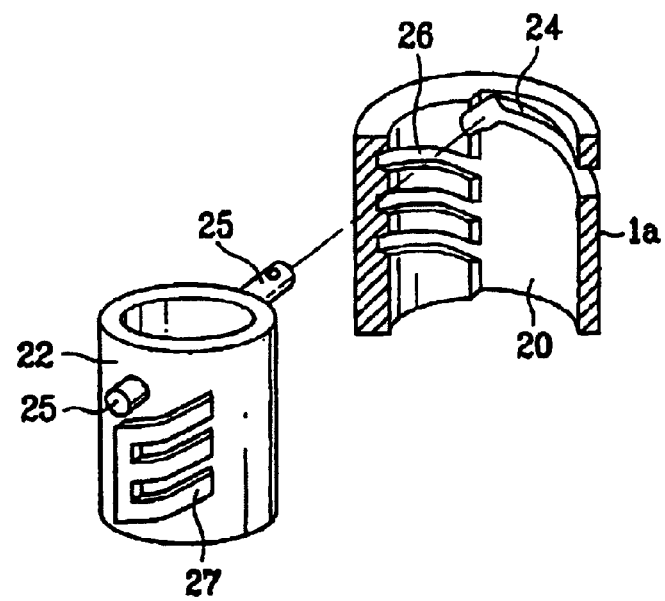
FIG. 11 shows a bird's-eye view of major disassembly to illustrate a guide cam and a support cam as components of the present invention.
Figure 12:
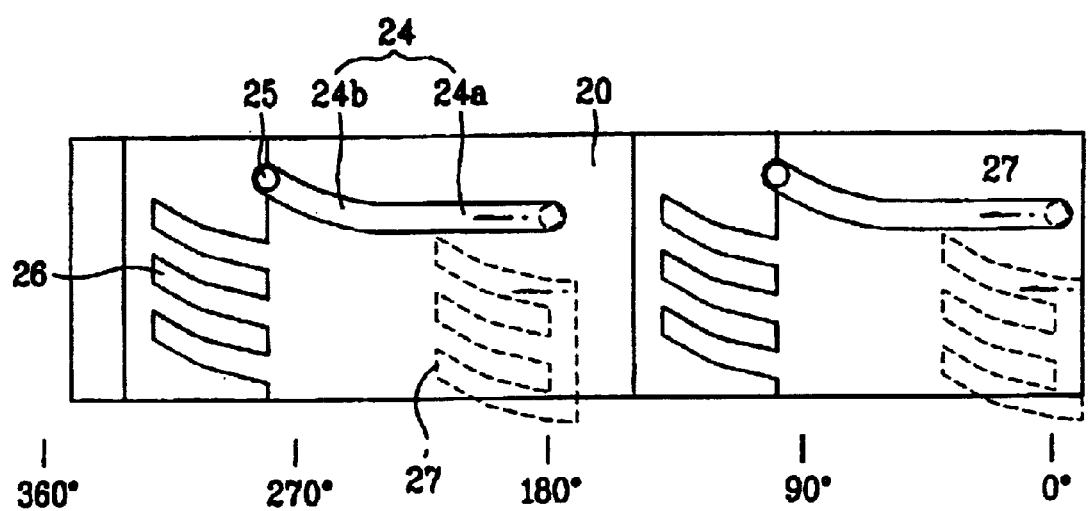
FIG. 12 shows a unfolded front of a circumferential surface of a second insertion hollow formed in a body to illustrate a guide cam and a support cam as components of the present invention.

And, FIG. 9 shows a cross-sectional view of major parts taken along a line II—II in FIG. 2, FIG. 10 shows a cross-sectional view of major parts taken along a line III—III in FIG. 2, FIG. 11 shows a bird's-eye view of major disassembly to illustrate a guide cam and a support cam as components of the present invention, and FIG. 12 shows a unfolded front of a circumferential surface of a second insertion hollow formed in a body to illustrate a guide cam and a support cam as components of the present invention.

In the description of a mobile terminal according to the present invention, the same construction of the mobile terminal according to the related art is skipped as well as the numerals given by the related art represents the same as they are.

First and second auxiliary keyboards 8 and 9 are hinge-jointed to both confronting rear ends of a lower surface of a back panel part 1b constructing a body 1 in part so as to move rotationally and horizontally. Thus, the first and second auxiliary keyboards 8 and 9 enable to be folded while front parts of the auxiliary keyboards 8 and 9 are inserted into the body 1, or be unfolded while the rest parts except the hinge-jointed parts are unfolded by being pulled out. A plurality of auxiliary input keys 10 and 11 are placed on upper surfaces of the first and second auxiliary keyboards 8 and 9 respectively, thereby enabling to input characters and numbers with the input keys 3 lying on an upper surface of a front panel part 1a.

A first body stopper 12 is formed at the lower surface of the back panel part 1b of the body 1 to the direct rear directions of the first and second auxiliary keyboards 8 and 9 so as to protrude out downwardly. When the first and second auxiliary keyboards 8 and 9 are unfolded completely, sides of the first and second auxiliary keyboards 8 and 9 are caught by the first body stopper 12 so that the first and second auxiliary keyboards 8 and 9 fail to be folded beyond a predetermined angle. The protrusion height of the first body stopper 12 is preferably formed to be as high as the thickness of the first or second auxiliary keyboard 8 or 9, thereby enabling to make the first body stopper 12 be in the same level of the first and second auxiliary keyboards 8 and 9 so as to be contacted together with a support surface when the first and second auxiliary keyboards 8 and 9 are supported by the support surface to use the mobile terminal by unfolding the first and second auxiliary keyboards 8 and 9.

A plurality of the input keys 3, which are placed at the upper surface of the front panel part 1a of the body 1, and a plurality of the auxiliary input keys 10 and 11, which are placed on the upper surfaces of the respective auxiliary keyboards 8 and 9, play the same role of a computer keyboard. A plurality of the input keys 3 are placed at the upper surface of the front panel part 1a of the body 1 are arranged by the same way of the related art, while a plurality of the auxiliary input keys 10 and 11 placed on the upper surfaces of the respective auxiliary keyboards 8 and 9 are arranged such that the keys except function keys of the computer keyboard are divided into two parts. Thus, it is preferable that the input keys 3 of the body 1 and the first and second auxiliary input keys 10 and 11 of the first and second auxiliary keyboards 8 and 9 are arranged in the same manner of the key arrangement of the computer keyboard.

On the other hand, the arrangement of the input keys 3 of the body 1 and the first and second auxiliary input keys 10 and 11 of the first and second auxiliary keyboards 8 and 9 may be formed variously in accordance with the proper usage purpose of the mobile terminal.

When the first and second auxiliary keyboards 8 and 9 are folded again from the unfolded state, first and second keyboard slant surfaces 13 and 14 are formed at upper and lower surfaces of initial contact parts (parts confronting the hinge-jointed parts to a width direction) to prevent the interference due to the initial contacts of the first and second auxiliary keyboards 8 and 9. A shelter recess 15 is formed at the first keyboard slant surface 13 of the first auxiliary keyboard 8 to prevent the interruption due to the hinge part of the second auxiliary keyboard 9 when the first auxiliary keyboard 8 is folded.

As mentioned in the above description, the first and second auxiliary keyboards 8 and 9 are hinge-jointed to both of the confronting rear ends of the lower surface of the back panel part 1b constructing the body 1 in part so as to move rotationally and horizontally. Thus, the first and second auxiliary keyboards 8 and 9 enable to be folded while the front parts of the auxiliary keyboards 8 and 9 are inserted into the body 1, or be unfolded while the rest parts except the hinge-jointed parts are unfolded by being pulled out. A structure of the hinge-jointed part by which the first auxiliary keyboard 8 rotates to move to a horizontal direction of the back panel part 1b is as follows.

A first insertion hollow 16 is formed in a lower part of the body 1, which is open to a direction of the first and second auxiliary keyboards 8 and 9, to be separated from a signal processing region part in an internal part of the body 1. A first support pipe 17 having a first support sill 17a at an internal circumference of an end is formed in the first insertion hollow 16 to leave an interval with a circumference of the first insertion hollow 16. A first insertion pipe 18 is formed on the upper surface of the first auxiliary keyboard 8 to be inserted into the first insertion hollow 16 formed in the body 1. And, a plurality of first hold pieces 19 having a first hold sill 19a at an end circumference are formed inside the first insertion pipe 18 so as to be supported by being caught by the first support sill 17a of the first support pipe 17.

The second auxiliary keyboard 9 is hinge-jointed to the back panel part 1b of the body 1 to move rotationally and horizontally. A second insertion hollow 20 is formed in a lower part of the body 1, which is open to a direction of the first and second auxiliary keyboards 8 and 9, to be separated from the signal processing region part in the internal part of the body 1. A second support pipe 21 having a second support sill 21a at an internal circumference of an end is formed in the second insertion hollow 20 to leave an interval with a circumference of the second insertion hollow 20. A second insertion pipe 22 is formed on the upper surface of the second auxiliary keyboard 9 to be inserted into the second insertion hollow 20 formed in the body 1. A plurality of second hold pieces 23 having a second hold sill 23a at an end circumference are formed inside the second insertion pipe 22 so as to be supported by being caught by the second support sill 21a of the second support pipe 21. A pair of guide cams 24, in each of which a straight line part 24a is connected smoothly to a slant part 24b sloped upward, are formed at a circumferential surface of the second insertion hollow 20 so as to confront each other. And, a pair of guide protrusions 25 are formed at confronting parts of the circumferential surface of the second insertion pipe 22 so as to be inserted into the guide cams 24 at the second insertion hollow 20 of the body 1. When the guide protrusion 25 is guided along the straight line part 24a of the guide cam 24 during the rotation of the second auxiliary keyboard 9, the second auxiliary keyboard 9 is unable to move toward the body 1 and the opposite direction of the body 1. When the guide protrusion 25 is guided along the slant part 24b of the guide cam 24 during the rotation of the second auxiliary keyboard 9, the second auxiliary keyboard 9 moves toward the body 1 and the opposite direction of the body 1.

A plurality of support cams 26 maintaining the same slant angle of the slant part 24b of the guide cam 24 are formed at the circumferential surface of the second insertion hollow 20 in the body 1 between the respective guide cams 24. And, a plurality of support protrusions 27 maintaining the same slant angle of the support cam 26 are formed between the respective guide protrusions 25 on the external circumference of the second insertion pipe 22 of the second auxiliary keyboard 9. Thus, the second auxiliary keyboard 9 is sufficiently supported by the body 1 even though being moved upward toward the body 1 since the respective support protrusions 27 are inserted into the support cam 26 when the second auxiliary keyboard 9 is unfolded rotationally by moving upward toward the body 1.

In the above constructions, the structure that the first auxiliary keyboard 8 is hinge-jointed to the lower surface of the body 1 so as to move rotationally and horizontally requires no displacement toward the body 1 upward and the opposite direction of the body 1 downward when the first auxiliary keyboard 8 is being rotated to be folded or unfolded, while the other structure that the second auxiliary keyboard 9 is hinge-jointed so as to move rotationally and horizontally needs a displacement toward the body 1 to the front and the opposite direction of the body 1 to the rear when the second auxiliary keyboard 9 is being rotated to be folded or unfolded. Being folded, the second auxiliary keyboard 9 is displaced downward, i.e. to the opposite direction of the body 1. Comparing a lower surface of the second auxiliary keyboard 9 to that of the first auxiliary keyboard 8, step difference amounting to the thickness of the second auxiliary keyboard 9 takes place. To the contrary, being unfolded, the second auxiliary keyboard 9 is displaced upward, i.e. toward the body 1. Comparing the lower surface of the second auxiliary keyboard 9 to that of the first auxiliary keyboard 8, both of the lower surfaces are in the same plane without step difference.

When a user selects the input keys 3 on the upper surface of the body 1 and the first and second auxiliary input keys 10 and 11 on the surfaces of the first and second auxiliary keyboards 8 and 9 to use the mobile terminal according to the present invention, the body 1 and the first and second auxiliary keyboards 8 and 9 have to be connected in circuit and software to carry out signal processing of the selected input keys 3 and auxiliary input keys 10 and 11 through a plurality of signal wires 28. Considering the rotary movement of the first and second auxiliary keyboards 8 and 9, the signal wires 28 are placed in a space part in the middle of the hinge-jointed parts of the first and second auxiliary keyboards 8 and 9 as a coiled form. Thus, one ends of the signal wires 28 are connected to the signal processing region part in the body 1, while the other ends of the signal wires are connected to the other signal processing region part in the first and second auxiliary keyboards.

It is preferable that the first and second auxiliary keyboards 8 and 9 move together. Thus, if one of the first and second auxiliary keyboards 8 and 9 is unfolded, the rest is unfolded simultaneously as well when a user makes use of a mobile terminal according to the present invention.

In the structure for this, a through-connection hole 29 is formed through a partition wall separating a first insertion hollow 16 formed in a body 1 from a signal processing region part installed inside the body 1 for the through-connection horizontally within a predetermined angle range, a fixed link 30 is formed at an external circumference of the first insertion pipe 18 of the first auxiliary keyboard 8 so as to be exposed to the signal processing region part in the body through the through-connection hole 29, one guide cam, which is formed next to the signal processing region part in the body 1, of the respective guide cams 24 is formed in the second insertion hollow 20 of the body 1 so as to be through-connected to the signal processing region part in the body, one guide protrusion, which is inserted into the guide cam 24 next to the signal processing region part in the body 1, of a pair of the guide protrusions 25 at the second insertion pipe 22 of the second auxiliary keyboard 9 extends to be exposed to the signal processing region part in the body 1, and both ends of a connection link 31 are hinge-jointed to an end of the fixed link 30 at the first insertion pipe 18 exposed to the signal processing region part inside the body 1 and one end of the guide protrusion 25 at the second insertion pipe 22 to be exposed to the signal processing region part in the body 1.

Considering that the second auxiliary keyboard 9 is unfolded upwardly to the direction of the body 1 or is folded downwardly to the opposite direction of the body 1 the hinge-joint between the connection link 31 and guide protrusion 25 should be formed in a manner that the guide protrusion 25 enables to be displaced together with the second auxiliary keyboard 9. For this operation, a length of a hinge axis hinge-connecting the connection link 31 to the guide protrusion 25 and fixed link 30 is sufficiently as long as the upward/downward displacement of the second auxiliary keyboard 9.

When folded completely by being hinge-jointed to the body 1 for rotation, the first and second auxiliary keyboards 8 and 9 move rotationally no more to the folding direction despite further applying force thereto. To achieve this performance, the construction is provided such that a first stopper insertion groove 32 is formed at one bottom edge of the body 1 to extend from a lateral side to the bottom edge, that a first keyboard stopper 33 is formed at a contact surface, which is an upper surface of the first auxiliary keyboard 8, of the body 1 to be caught in the first stopper insertion groove 32 when the first auxiliary keyboard 8 is completely folded, that a second stopper insertion groove 34 is formed at a side of the first auxiliary keyboard 8 confronting the first keyboard stopper 33 so as to extend from the lateral side to a bottom edge, and that a second keyboard stopper 35 is formed at a portion of side of a first auxiliary keyboard contact surface of an upper surface of the second auxiliary keyboard 9 so as to be engaged with the second stopper insertion groove at the first auxiliary keyboard 8 when the first and second auxiliary keyboards 8 and 9 are completely folded in order.

Both sides to a length direction and an inner side of a width direction of the first stopper insertion groove 32 at the body 1 merge inwardly to the direction getting far from the body 1, thereby forming a first insertion groove slant surface 32a. And, both sides to a length direction and an inner side to a width direction of the first keyboard stopper 33 at the first auxiliary keyboard 8 become wider outwardly to the direction getting far from the first auxiliary keyboard 8, thereby forming a first stopper slant surface 33a. When the first keyboard stopper 33 at the first auxiliary keyboard 8 is engaged with the first stopper insertion groove 31 at the body 1, the first auxiliary keyboard 8 is locked into the body 1 by the first insertion groove slant slope 32a and the first stopper slant surface 33a. This function prevents the first auxiliary keyboard 8 from being displaced downwardly even if the first auxiliary keyboard 8 is forced to the lower direction getting far from the body 1 due to carelessness during using the mobile terminal.

Besides, both sides, to a length direction, and an inner side, to a width direction, of the second stopper insertion groove 34 at the first auxiliary keyboard 8 merge inwardly to the direction getting far from the first auxiliary keyboard 8, thereby forming a second insertion groove slant surface 34a. And, both sides, to a length direction, and an inner side, to a width direction, of the second keyboard stopper 35 at the second auxiliary keyboard 9 become wider outwardly to the direction getting far from the second auxiliary keyboard 9, thereby forming a second stopper slant surface 35a. When the second keyboard stopper 35 at the second auxiliary keyboard 9 is engaged with the second stopper insertion groove 34 at the first auxiliary keyboard 8, the second auxiliary keyboard 9 is locked into the first auxiliary keyboard 8 by the second insertion groove slant surface 34a and the second stopper slant surface 35a. This function prevents the second auxiliary keyboard 9 from being displaced downwardly even if the second auxiliary keyboard 9 is forced to the lower direction getting far from the body 1 due to carelessness during using the mobile terminal.

A second body stopper 36 is formed at a portion of the lower surface of the body 1 confronting diagonally the hinge-jointed part of the first auxiliary keyboard 8 and leaving slightly an interval from the boundary of lower surface. When the first auxiliary keyboard 8 is completely folded into the body 1, a partial front surface of the first auxiliary keyboard 8 is caught by the inner surface of the second body stopper 36 so as not to be move rotationally to the folding direction. And, a third keyboard stopper 37 is formed at a portion of the upper surface of the second auxiliary keyboard 9 confronting the hinge-jointed part to a length direction. When the second auxiliary keyboard 9 is completely folded into the body 1, the third keyboard stopper 37 at the second auxiliary keyboard 9 is caught by the external surface of the second body stopper 36 so as not to be move rotationally to the folding direction.

And, an inner side, to a width direction, of the second keyboard stopper 36 at the body 1 becomes wider outwardly to the direction getting far from the body 1, thereby forming a third stopper slant surface 36a. A part of a front portion of the first auxiliary keyboard 8, which confronts the second body stopper 36, merges inwardly to the direction getting far from the body 1 when the first auxiliary keyboard is folded, thereby forming a third keyboard slant surface 8a. Being folded completely, the first auxiliary keyboard 8 is locked into the body 1 by the third keyboard slant surface 8a and the third stopper slant surface 36a. This function prevents the first auxiliary keyboard 8 from being displaced downwardly even if the first auxiliary keyboard 8 is forced to the lower direction getting far from the body 1 due to carelessness during using the mobile terminal.

Moreover, an external surface, to a width direction, of the second keyboard stopper 36 at the body 1 becomes wider outwardly to the direction getting far from the body 1, thereby forming a fourth stopper slant surface 36b. An inner surface of the third keyboard stopper 37 at the second auxiliary keyboard 9 becomes wider outwardly to the direction getting far from the second auxiliary keyboard 9, thereby forming a fifth stopper slant surface 37a. Being folded completely, the second auxiliary keyboard 9 is locked into the body 1 by the fourth and fifth stopper slant surface 36b and 37a. This function prevents the second auxiliary keyboard 9 from being displaced downwardly even if the second auxiliary keyboard 9 is forced to the lower direction getting far from the body 1 due to carelessness during using the mobile terminal.

The second body stopper 36 is preferably formed to be as high as the thickness of the first or second auxiliary keyboard 8 or 9, thereby enabling to make the second body stopper 36 be in the same level of the first and second auxiliary keyboards 8 and 9 as well as the first body stopper 12 so as to be contacted together with a support surface when using the mobile terminal by unfolding the first and second auxiliary keyboards 8 and 9.

As mentioned in the above explanation, the mobile terminal according to the present invention includes a sensor switch (not shown in the drawing) detecting whether the first and second auxiliary keyboards 8 and 9 are folded or unfolded. And, the sensor switch is connected to a microcomputer controlling the operation of the mobile terminal so as to transfer signals therebetween. If the first and second auxiliary keyboards 8 and 9 are judged as folded through the sensor switch, constant voltage supply to the auxiliary input keys 10 and 11 is shut down so as to ignore the signal coming from the pressed auxiliary input key of a plurality of the auxiliary input keys.

The manual processing of the above-constructed mobile terminal according to the present invention is as follows in detail.

The mobile terminal of the present invention is used by having entire parts of the first and second auxiliary keyboards 8 and 9 inserted into the body 1 by folding the first and second auxiliary keyboards 8 and 9 or by taking out the first and second auxiliary keyboards 8 and 9 except the hinge-jointed parts by unfolding the first and second auxiliary keyboards 8 and 9. The former is carried out in a manner of the related art, thereby being skipped in this description. The latter processing of using the mobile terminal by unfolding the first and second auxiliary keyboards 8 and 9 will be explained in detail as follows.

When folded are the first and second auxiliary keyboards 8 and 9 which are hinge-jointed to both confronting rear parts of the lower surface of the back panel part 1b constructing the body 1, the first auxiliary keyboard 8 is placed directly below the body 1 and the second auxiliary keyboard 9 is placed directly below the first auxiliary keyboard 8. In this case, constant voltage supply to the auxiliary input keys 10 and 11 installed on the first and second auxiliary keyboards 8 and 9 respectively is shut down by the sensor switch so as to ignore the selection signals coming from the pressed auxiliary input keys.

Therefore, when the first and second auxiliary keyboards 8 and 9 are folded into the body 1, the folder 2 of which one end is hinge-jointed to the rear end of the body 1 is opened so that some of a plurality of the input keys 3 installed on the upper surface of the front panel part 1a of the body 1 are pressed for using the mobile terminal.

Further, the first and second auxiliary keyboards 8 and 9 are unfolded from the folded state as shown in FIG. 4 provided that the input keys 3 on the body and the auxiliary input keys 10 and 11 on the first and second auxiliary keyboards 8 and 9 are used as the computer keyboard. When the first and second auxiliary keyboards unfolded, recognized are the signals generated from selecting the input keys 3 on the upper surface of the front panel part 1a of the body 1 and the other signals generated from selecting the auxiliary input keys 10 and 11 on the auxiliary keyboards 8 and 9 respectively. In this case, the selection signals of the input keys 3 on the upper surface of the front panel part 1a of the body 1 fail to be treated with the same manner of the related art but are recognized as the signals from the keys arranged in the middle part of the computer keyboard, while the selection signals of the auxiliary input keys 10 and 11 installed on the upper surfaces of the first and second auxiliary keyboards 8 and 9 are recognized to be processed as other signals of the rest keys on the computer keyboard.

Hence, while the first and second keyboards 8 and 9 are unfolded, a user makes use of the input keys 3 on the body 1 and the auxiliary input keys 10 and 11 on the first and second auxiliary keyboards 8 and 9 respectively as the computer keyboard so as to acquire wanted information or transmit various data to the other parties by selecting required keys.

On the other hand, as mentioned in the foregoing description, when the first and second auxiliary keyboards 8 and 9 hinge-jointed to the body 1 to move rotationally and horizontally are folded, the first auxiliary keyboard 8 is placed directly below the body 1 and the second auxiliary keyboard 9 is placed directly below the first auxiliary keyboard 8. Thus, the body 1, the first auxiliary keyboard 8, and the second auxiliary keyboard 9 are stacked in order. When the first and second auxiliary keyboards 8 and 9 are unfolded to use the auxiliary input keys 10 and 11 installed on the first and second auxiliary keyboards 8 and 9, respectively, as the keys of the computer keyboard, the second auxiliary keyboard 2 moves immediately toward the body 1 upward for a while. Then, the second auxiliary keyboard 9 stops moving toward the body 1 as soon as the first and second auxiliary keyboards 8 and 9 are unfolded completely, whereby the lower surfaces of the first and second auxiliary keyboards 8 and 9 lie in the same horizontal plane.

When the first and second auxiliary keyboards 8 and 9 are completely unfolded by being moved rotationally and horizontally, the second auxiliary keyboard 9 completes its moving toward the body 1 so as to put the lower surfaces of the first and second auxiliary keyboards 8 and 9 on the same horizontal plane. Accordingly, it is able to make the mobile terminal support stable by having the entire lower surfaces of the first and second auxiliary keyboards 8 and 9 contacted with a ground when the mobile terminal of the present invention is supported by the ground in order to use the input keys 3 on the body and the auxiliary input keys 10 and 11 on the first and second auxiliary keyboards 8 and 9 as the computer keyboard by unfolding the first and second auxiliary keyboards 8 and 9.

After the first and second auxiliary keyboards 8 and 9 have been unfolded completely, lateral rear sides of the first and second auxiliary keyboards 8 and 9 are caught respectively by the first body stopper 12 of the lower surface of the back panel part 1b of the body 1 protruding downwardly toward the direct rear directions of the first and second auxiliary keyboards 8 and 9, thereby stopping unfolding the first and second auxiliary keyboards 8 and 9. It is preferable to maintain the completely-unfolded state of the first and second auxiliary keyboards 8 and 9 with a predetermined angle providing the user with the best convenience in human engineering. For example, it is preferable to maintain the angle 90° to 100° by taking the initially-folded state as a reference.

Considering aesthetic design as well as the intention that both of the first body stopper 12 and the first and second auxiliary keyboards 8 and 9 are contacted with the ground by lying on the same horizontal plane when the mobile terminal is used by unfolding the first and second auxiliary keyboards 8 and 9, the protrusion height of the first body stopper 12 formed at the lower surface of the back panel part 1b of the body 1 is preferably as good as the thickness of the first and second auxiliary keyboards 8 and 9.

As mentioned in the foregoing description, when the first and second auxiliary keyboards 8 and 9 are completely unfolded by being moved rotationally and horizontally, the second auxiliary keyboard 9 has to complete its moving toward the body 1 so as to put the lower surfaces of the first and second auxiliary keyboards 8 and 9 on the same horizontal plane. Hereinafter, a stage that the second auxiliary keyboard 9 only moves toward the body 1, i.e. upwardly, the moment the first and second auxiliary keyboards 8 and 9 are unfolded will be described in detail. First of all, the state that the first and second auxiliary keyboards 8 and 9 are hinge-jointed to move rotationally to a horizontal direction is explained as follows.

In order to unfold the first and second auxiliary keyboards 8 and 9 from the folded state, the first auxiliary keyboard 8 has to rotate clockwise centering around the hinge-jointed part in the drawing as well as the second auxiliary keyboard 9 has to rotate counterclockwise centering around the other hinge-jointed part in the drawing. The rotational movement of the first auxiliary keyboard 8 can be achieved by the first insertion hollow 16 formed to be separated from the signal processing region part in the body 1 at the lower surface of the body 1 of which lower surface to the direction of the first and second auxiliary keyboards 8 and 9 is open, the first support pipe 17 having the first support sill 17a at the internal circumference end and formed in the first insertion hollow 16 to leave a space with the circumferential surface of the first insertion hollow 16, the first insertion pipe 18 at the upper surface of the first auxiliary keyboard 8 so as to be inserted into the first insertion hollow 16, and a plurality of the first hold pieces 19 formed inside the first insertion pipe 18 and having the first hold sill 19a at the external edge to be caught by the first support sill 17a at the first support pipe 17. And, the rotational movement of the second auxiliary keyboard 9 can be achieved by the second insertion hollow 20 formed to be separated from the signal processing region part in the body 1 at the lower surface of the body 1 of which lower surface to the direction of the first and second auxiliary keyboards 8 and 9 is open, the second support pipe 21 having the second support sill 21a at the internal circumference end and formed in the second insertion hollow 20 to leave a space with the circumferential surface of the second insertion hollow 20, the second insertion pipe 22 at the upper surface of the second auxiliary keyboard 9 so as to be inserted into the second insertion hollow 20, and a plurality of the second hold pieces 23 formed inside the second insertion pipe 22 and having the second hold sill 23a at the external edge to be caught by the second support sill 21a at the second support pipe 21.

The process that the second auxiliary keyboard 9 only moves upward, i.e. to the direction of the body 1 when the first and second keyboards 8 and 9 are unfolded is explained as follows. When the second keyboard 9 rotates counterclockwise in the drawing, the second insertion pipe 22 which is being inserted in the second insertion hollow 20 at the body 1 rotates centering around the second support pipe 21. In this case, a pair of guide cams 24, in each of which a straight line part 24a is connected smoothly to a slant part 24b sloped upward from the straight line part 24a, are formed at a circumferential surface of the second insertion hollow 20 to confront each other, while each guide protrusion 25 inserted in each guide cam 24 at the second insertion hollow 20 of the body 1 is formed at the opposite part of the external circumferential surface of the second insertion pipe 22. Thus, the guide protrusion 25 at the second insertion pipe 22 is guided by the straight line part 24a of the guide cam 24 at the circumferential surface of the second insertion hollow 20 and then successively and smoothly guided by the slant part 24b. And, when the guide protrusion 25 is guided by the slant part 24b of the guide cam 24, the second insertion pipe 22 moves upwardly to the body 1 naturally. Consequently, after the second auxiliary keyboard 9 has moved toward the body 1 upwardly, the lower surface of the second auxiliary keyboard 9 enables to be disposed on the same horizontal line of the lower surface of the first auxiliary keyboard 8.

As mentioned in the foregoing description, when the second auxiliary keyboard 9 has not moved upwardly toward the body 1 to be unfolded during the horizontal rotation, the guide protrusion 25 at the second insertion pipe 22 is guided by the straight line part 24a of the guide cam 24 at the second insertion hollow 20. When the second auxiliary keyboard 9 has moved upwardly toward the body 1 to be unfolded during the horizontal rotation, the guide protrusion 25 at the second insertion pipe 22 is guided by the slant part 24b of the guide cam 24 at the second insertion hollow 20. Until the second auxiliary keyboard 9 rotates only, the support protrusion 27 at the external circumferential surface of the second insertion pipe 22 is not inserted in the support cam 26 between the respective guide cams 24 of the circumferential surface of the second insertion hollow 20. From the moment that the second auxiliary keyboard 9 rotates to move toward the body 1, the support protrusion 27 is inserted into the support cam 26. Finally, the support protrusion 27 is completely engaged with the support cam 26 after the second auxiliary keyboard 9 has been unfolded completely.

Namely, the support cam 26 at the circumference of the second insertion hollow 20 of the body 1 maintains the same slope degree of the slant part 24b of the guide cam 24 and the support protrusion 27 at the circumference of the second insertion pipe 22 maintains the same slope degree of the support cam 26. Therefore, the support protrusion 27 fails to be inserted in the support cam 26 when the second auxiliary keyboard 9 rotates only, but starts to be inserted into the support cam 26 when the second auxiliary keyboard 9 rotates to move toward the body 1. It is able to adjust properly the positions of the guide cam 24 and support cam 26 at the second insertion hollow 20 and the other positions of the guide protrusion 25 and support protrusion 27. Thus, it does not matter to design such a structure In the above explanation, the support protrusion 27 starts to be engaged with the support cam 26 as soon as the second auxiliary keyboard 9 moves upwardly toward the body 1 when the second auxiliary keyboard 9 is unfolded. Thus, when the second auxiliary keyboard 9 starts to move toward the body 1 upwardly, it is able to achieve the stable support of the second auxiliary keyboard 9 even though the second hold sill 23a of the second hold piece 23 is no more caught by the second support sill 21a of the second support pipe 21 at the body 1. Therefore, the support of the second auxiliary keyboard 9 from the moment that the second auxiliary keyboard 9 starts to move upwardly toward the body 1 is achieved by the support owing to the guidance of the guide protrusion 25 by the guide cam 24 and the insertion of the support protrusion 27 into the support cam 26.

In case that the mobile terminal of the present invention is supported by the support surface so as to be used by unfolding the first and second auxiliary keyboards 8 and 9, the stable support of the mobile terminal is achieved, considering that both of the lower surfaces lie on the same horizontal line, since the first and second auxiliary keyboards 8 and 9 are supported simultaneously by the support surface. When the mobile terminal is supported by the support surface, the stable support of the mobile terminal is improved since the first and second body stoppers 12 and 36 are supported by the support surface with the first and second auxiliary keyboards 8 and 9 so as to provide a large contact area for the support.

When the first and second auxiliary keyboards 8 and 9 rotates to move centering around the hinge-jointed parts to the body 1 so as to be unfolded from the folded state, a time point from which the second auxiliary keyboard 9 starts to move upwardly toward the body 1 has to be just before the first and second auxiliary keyboards 8 and 9 start to be separated each other in a view of plane/bottom. Thus, the straight line part 24a and slant part 24b of the guide cam 24 formed around the second insertion hollow 20 in the body 1 are adjusted properly.

Besides, the time point that the second auxiliary keyboard 9 starts to move upwardly toward the body 1 in a plane/bottom view on rotating to move to the unfolding direction has to be just before the first and second auxiliary keyboards 8 and 9 start to be separated, which means that the second auxiliary keyboard 9 fails to practically move upwardly toward the body 1 due to the interference of the first auxiliary keyboard 8. This is because the first and second auxiliary keyboards 8 and 9 are overlapped with each other to some degrees in a plane/bottom view despite the upward moving force applied to the second auxiliary keyboard 9.

Moreover, when a use of the mobile terminal of the present invention is finished or when the input keys 3 on the body 1 are used for a simple use, the first and second auxiliary keyboards 8 and 9 are rotated to move to an opposite direction of the unfolding so that the body 1, the first auxiliary keyboard 8 and the second auxiliary keyboard 9 are overlapped in order downwardly. In this case, as the first and second keyboard slant surfaces 13 and 14 are formed to confront each other at the contact parts (which confront the hinge-jointed parts to a width direction) of the first and second auxiliary keyboards 8 and 9 which are folded as in FIG. 5B, the folding procedure of the first and second auxiliary keyboards 8 and 9 is carried out smoothly with no interference generated from the initial contact. And, during the folding procedure of the first and second auxiliary keyboards 8 and 9, the first auxiliary keyboard 8 enables to be folded completely without the interference caused by the hinge part of the second auxiliary keyboard 9 since the hinge part of the second auxiliary keyboard 9 is inserted into the shelter recess 15 at the first keyboard slant surface 13 of the first auxiliary keyboard 8.

When the first and second auxiliary keyboards 8 and 9 are folded again from the unfolded state, the second auxiliary keyboard 9 first moves downward toward the opposite direction of the body 1 until the initial contact between the first and second auxiliary keyboards 8 and 9 (i.e. the initial contact means that the first auxiliary keyboard 8 starts to be disposed on/overlapped with the second auxiliary keyboard 9) begins, and then just rotates continuously with no more movement downward to the opposite direction. This is achieved in a manner that the respective guide protrusions 25 formed at the second insertion pipe 22 of the second auxiliary keyboard 9 are guided by the slant part 24b of the guide cam and the straight line part 24a successively.

By the above-explained procedures, when the first and second auxiliary keyboards 8 and 9 are folded, the first keyboard stopper 33 at one party of the surface confronting the body 1, which is the upper surface of the first auxiliary keyboard 8, is inserted into the first stopper insertion groove 32 formed continuously from the one side of the body 1 to the lower surface in part, while the second keyboard stopper 35 at one party of the surface confronting the first auxiliary keyboard 8, which is the upper surface of the second auxiliary keyboard 9, is inserted into the second stopper insertion groove 34 formed at a portion of the first auxiliary keyboard 8 continuously from one side confronting the first keyboard stopper 33 to the lower surface. When the first keyboard stopper 33 is inserted in to the first stopper insertion groove 32, the first insertion groove slant surface 32a is formed at both side surfaces of the first stopper insertion groove 32 to a length direction and an inner side surface to a width direction so as to merge inside to the direction getting far from the body 1. And, the first stopper slant surface 33a is formed at both side surfaces of the first keyboard stopper 33 to the length direction and the inner side surface to the width direction so as to become wider outwardly to the direction getting far from the first auxiliary keyboard 8. Thus, the first auxiliary keyboard 8 becomes locked to the body 1 because of the first insertion groove slant surface 32a and the first stopper slant surface 33a so that the first auxiliary keyboard 8 is prevented from moving downward to the opposite direction of the body 1 even if a user pushes down the first auxiliary keyboard 8 against the body 1 due to carelessness on using or carrying the mobile terminal of the present invention. When the second keyboard stopper 35 is inserted in to the second stopper insertion groove 34, the second insertion groove slant surface 34a is formed at both side surfaces of the second stopper insertion groove 34 to a length direction and an inner side surface to a width direction so as to merge inwardly to the direction getting far from the first auxiliary keyboard 8. And, the second stopper slant surface 35a is formed at both side surfaces of the second keyboard stopper 35 to the length direction and the inner side surface to the width direction so as to become wider outwardly to the direction getting far from the second auxiliary keyboard 8. Thus, the second auxiliary keyboard 9 becomes locked to the first auxiliary keyboard 8 because of the second insertion groove slant surface 34a and the second stopper slant surface 35a so that the second auxiliary keyboard 9 is prevented from moving downward to the opposite direction of the body 1 even if a user pushes down the second auxiliary keyboard 9 against the body 1 due to carelessness on using or carrying the mobile terminal of the present invention.

Moreover, when the first and second auxiliary keyboards 8 and 9 are folded, a front portion of the first auxiliary keyboard 8 is caught by an inner surface of the second body stopper 36 withdrawn slightly inward on the lower surface of the body 1 at a diagonal part confronting the hinge-jointed part to the first auxiliary keyboard 8, whereby the folding-directional rotation of the first auxiliary keyboard 8 is prevented more perfectly. And, the third keyboard stopper 37 formed at the edge of the lower surface of the second auxiliary keyboard 9 confronting the hinge-jointed part to a length direction is caught by the external surface of the second body stopper 36, whereby the folding-directional rotation of the second auxiliary keyboard 9 is prevented more perfectly. When the front portion of the first auxiliary keyboard 8 is caught by the inner surface of the second body stopper 36, the third stopper slant surface 36a is formed at the inner side of the second body stopper 36 to the width direction so as to become wider outwardly to the direction getting far from the body 1. And, the third keyboard slant surface 8a is formed at the part of the front surface of the first auxiliary keyboard 8 confronting the second body stopper 36 so as to merge inward to the direction getting far from the body 1 when the first auxiliary keyboard 8 is folded. Thus, when the first auxiliary keyboard 8 is completely folded, the first auxiliary keyboard 8 becomes locked to the body 1 because of the third stopper slant surface 36a and the third keyboard slant surface 8a so that the first auxiliary keyboard 8 is prevented from moving downward to the opposite direction of the body 1 even if a user pushes down the first auxiliary keyboard 8 against the body 1 due to carelessness on using or carrying the mobile terminal of the present invention. The fourth stopper slant surface 36b is formed at the external surface of the second body stopper 36 to the width direction so as to become wider outwardly to the direction getting far from the body 1. And, the fifth stopper slant surface 37a is formed at the internal surface of the third keyboard stopper 37 to the width direction so as to become wider outwardly to the direction getting far from the second auxiliary keyboard 9. Thus, when the second auxiliary keyboard 9 is completely folded, the second auxiliary keyboard 9 becomes locked to the body 1 because of the fourth stopper slant surface 36b and the fifth stopper slant surface 37a so that the second auxiliary keyboard 9 is absolutely prevented from moving downward to the opposite direction of the body 1 even if a user pushes down the second auxiliary keyboard 9 against the body 1 due to carelessness on using or carrying the mobile terminal of the present invention.

On the other hand, when a user folds or unfolds the first and second auxiliary keyboards 8 and 9 in the operation of the present invention, both auxiliary keyboards 8 and 9 are folded or unfolded simultaneously by folding/unfolding one of the first and second auxiliary keyboards 8 and 9 without folding/unfolding both of the first and second auxiliary keyboards 8 and 9 respectively. This function is provided by the structure enabling to move together the first and second auxiliary keyboards 8 and 9.

The procedure of moving together the first and second auxiliary keyboards 8 and 9 is described in detail as follows.

The state represented by the solid lines in FIG. 8 indicates that the first and second auxiliary keyboards 8 and 9 are folded.

From this state, if a user unfolds the second auxiliary keyboard 9 by rotating to move the second auxiliary keyboard 9 counterclockwise in the drawing, the second insertion pipe 22, which is inserted into the second insertion hollow 20 at the lower surface of the body 1, on the upper surface of the second keyboard 9 is rotated counterclockwise and one of a pair of the guide protrusions 25, which is formed at the second insertion pipe 22 next to the signal processing region part installed in the body 1 and is being exposed to the signal processing region part, moves as designated by the one-pointed broken line without being interrupted through the one of a pair of the guide cams 24, which is next to the signal processing region part installed in the body 1, at the second insertion hollow 20 of the body 1. And, the connection link 31 hinge-jointed to one end of the guide protrusion 25 also moves as designated by the one-pointed broken line in the drawing.

Namely, the first insertion pipe 18 is formed at the upper surface of the first auxiliary keyboard 8 so as to be inserted into the first insertion hollow 16, the fixed link 30 is formed at the first insertion pipe 18 so as to be exposed to the signal processing region part inside the body through the through-connection hole 29 at the partition wall separating the first insertion hollow 16 at the body 1 from the signal processing region part onside the body 1 and one end of the connection link 31 of which other end is hinge-jointed to the guide protrusion 25 is connected to the end of the fixed link 30. If the connection link 31 in the signal processing region part of the body 1 is displaced according to the counterclockwise rotation of the second auxiliary keyboard 9 in the drawing, the fixed link 30 is displaced along the through-connection hole 29 as designated by the one-pointed broken line as well as the first insertion pipe 18 is rotated clockwise in the drawing. Subsequently, the first auxiliary keyboard 8 is also unfolded by being rotated to move centering around the hinge-jointed part clockwise in the drawing. Consequently, the first and second auxiliary keyboards 8 and 9 move together so as to be unfolded simultaneously.

The through-connection hole 29 between the first insertion hollow 16 at the body 1 and the signal processing region part inside the body 1 should have a shape free from the interruption caused by the fixed link 30 at the first insertion pipe 18. It is preferable to form the shape of the through-connection hole 29 as a straight line since there is no moving upward/downward or to/against the body direction during the operation of folding/unfolding the first auxiliary keyboard 8 having the first insertion pipe 18.

It is easy to be understood that the first and second auxiliary keyboards 8 and 9 are folded by moving together as well.

Although a folder type mobile terminal is taken as an embodiment of the present invention, the present invention enables to be embodied in flip, bar and any kind of type mobile terminals, and further in PDA, IMT-2000 terminals, and electronic schedulers.

INDUSTRIAL APPLICABILITY

Accordingly, a mobile terminal according to the present invention enables to carry out information input and transmission/receive of various data without selecting several characters, numbers and the like by a single input key, which is achieved by using input keys installed on a body only and folding first and second auxiliary keys hinge-jointed to the body when using the mobile terminal as a conventional one or by using auxiliary input keys installed on the unfolded first and second auxiliary keyboards as well as the input keys installed on the body when used as a computer keyboard.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A mobile station comprising:
   a body having a plurality of input keys on an upper surface;
   a first and a second auxiliary keyboards hinge-jointed respectively to both confronting parts of a lower surface of the body so as to rotate to move horizontally wherein entire parts of the first and second auxiliary keyboards are inserted into the body so as to be folded or the rest parts of the first and second auxiliary keyboards except the hinge-jointed parts are drawn out from the body so as to be unfolded; and
   a plurality of auxiliary input keys on upper surfaces of the first and second auxiliary keyboards so as to input characters, numbers with the input keys of the body when the first and second auxiliary keyboards are unfolded.

2. The mobile station of claim 1, wherein step difference occurs between lower surfaces of the first and second auxiliary keyboards which are overlapped with each other because the second auxiliary keyboard has moved downwardly when the first and second auxiliary keyboards hinge-jointed to the body are folded, and wherein the lower surface of the first and second auxiliary keyboards running parallel with each other lie in a same horizontal plane because the second key board has moved upwardly when the first and second keyboards are unfolded.

3. The mobile station of claim 2, wherein a first insertion hollow is formed in a lower part of the body, which is open to a direction of the first and second auxiliary keyboards, to be separated from a signal processing region part in an internal part of the body, a first support pipe having a first support sill at an internal circumference of an end is formed in the first insertion hollow to leave an interval with a circumference of the first insertion hollow, a first insertion pipe is formed on the upper surface of the first auxiliary keyboard to be inserted into the first insertion hollow formed in the body, a plurality of first hold pieces having a first hold sill at an end circumference are formed inside the first the first support pipe, a second insertion hollow is formed in a lower part of the body, which is open to the direction of the first and second auxiliary keyboards to be separated from the signal processing region part in the internal part of the body, a second support pipe having a second support sill at an internal circumference of an end is formed in the second insertion hollow to leave an interval with a circumference of the second insertion hollow, a second insertion pipe is formed on the upper surface of the second auxiliary keyboard to be inserted into the second insertion hollow formed in the body, a plurality of second hold pieces having a second hold auxiliary at an end circumference are formed inside the second insertion pipe so as to be supported by being caught by the second support sill of the second support pipe, a pair of guide cams, in each of which a straight line part is connected smoothly to a slant part sloped upward, formed at a circumferential surface of the second insertion hollow so as to confront each other, and a pair of guide protrusions formed at confronting parts of the circumferential surface of the second insertion pipe so as to be inserted into the guide cam at the second insertion hollow of the body, wherein the second auxiliary keyboard is unable to move toward the body and the opposite direction of the body when the guide protrusion is guided along the straight line part of the guide cam during the rotation of the second auxiliary keyboard, and wherein the second auxiliary keyboard moves toward the body and the opposite direction of the body when the guide protrusion is guided along the slant part of the guide cam during the rotation of the second auxiliary keyboard.

4. The mobile station of claim 3, wherein a through-connection hole is formed through a partition wall separating a first insertion hollow formed in a body from a signal processing region part installed inside the body for the through-connection horizontally within a predetermined angle range, a fixed link is formed at an external circumference of the first insertion pipe of the first auxiliary keyboard so as to be exposed to the signal processing region part in the body through the through-connection hole, one guide cam, which is formed next to the signal processing region part in the body, of the respective guide cams is formed in the second insertion hollow of the body so as to be through-connected to the signal processing region part in the body, one guide protrusion, which is inserted into the guide cam next to the signal processing region part in the body, of a pair of the guide protrusions at the second insertion pipe of the second auxiliary keyboard extends to be exposed to the signal processing region part in the body, and both ends of a connection link are hinge-jointed to an end of the fixed link at the first insertion pipe exposed to the signal processing region part inside the body and one end of the guide protrusion at the second insertion pipe to be exposed to the signal processing region part in the body.

5. The mobile station of claim 3, wherein a plurality of support cams are formed between the respective guide cams at the circumference of the second insertion hollow of the body so as to maintain a same slope degree of a slant part of the guide cam, wherein a plurality of support protrusion are formed at the external circumferential surface of the second insertion pipe of the second auxiliary keyboard so as to maintain a same slope of the support cam, and wherein the body is supported stably after the second auxiliary keyboard has moved upwardly toward the body by making the respective support protrusions to be inserted into the support cam when the second auxiliary keyboard rotates to move toward the body.

6. The mobile station of claim 2, wherein a first keyboard slant surface is formed at a lower surface of an initial contact part of the first auxiliary keyboard which is contacted with the second auxiliary keyboard when being folded from an unfolded state, wherein a second keyboard slant surface is formed at an upper surface of another initial contact part of the second auxiliary keyboard which is contacted with the first auxiliary keyboard when being unfolded from the unfolded state, and wherein the first and second keyboard slant surfaces prevent an interruption due to the initial contact when the first and second auxiliary keyboards are folded from the unfolded state.

7. The mobile station of claim 6, wherein a shelter recess is formed at the first keyboard slant surface of the first auxiliary keyboard so as to prevent the interruption due to the hinge-part or the second auxiliary keyboard when the first auxiliary keyboard is folded.

8. The mobile station of claim 2, wherein a shelter recess is formed at the first keyboard slant surface of the first auxiliary keyboard so as to prevent the interruption due to the hinge-part or the second auxiliary keyboard when the first auxiliary keyboard is folded.

9. The mobile station of claim 2, wherein a first body stopper is formed on the lower surface of the body to the direct rear directions of the first and second auxiliary keyboards so as to protrude out downwardly, and wherein rear sides of the first and second auxiliary keyboards are caught by the first body stopper respectively so that the first and second auxiliary keyboards are unable to be folded beyond a predetermined angle when the first and second auxiliary keyboards are unfolded completely.

10. The mobile station of claim 9, wherein a protrusion height of the first body stopper is formed to be as high as a thickness of the first or second auxiliary keyboard so as to make the first body stopper be contacted together with a support surface when the first and second auxiliary keyboards are supported by the support surface on unfolding the first and second auxiliary keyboards.

11. The mobile station claim 2, further comprising:
a first stopper insertion groove formed at one bottom edge of the body to extend from a lateral side to the bottom edge;
a first keyboard stopper formed at a contact surface, which is an upper surface of the first auxiliary keyboard, of the body to be caught in the first stopper insertion groove when the first auxiliary keyboard is completely folded;
a second stopper insertion groove formed at a side of the first auxiliary keyboard confronting the first keyboard stopper so as to extend from the lateral side to a bottom edge; and
a second keyboard stopper formed at a side portion toward the first auxiliary keyboard, which is an upper surface of the second auxiliary keyboard, so as to be engaged with the second stopper insertion groove at the first auxiliary keyboard when the first and second auxiliary keyboards are completely folded in order, wherein the first and second auxiliary keyboards move rotationally no more to the folding direction despite applying force further thereto when folded completely.

12. The mobile station of claim 11, wherein both sides to a length direction and an inner side of a width direction of the first stopper insertion groove at the body merge inwardly to the direction getting far from the body so as form a first insertion groove slant surface and both sides to the length direction and an inner side so the width direction of the first keyboard stopper at the first auxiliary keyboard become wider outwardly to the direction getting far from the first auxiliary keyboard so as to form a first stopper slant surface, and wherein the first auxiliary keyboard is locked into the body by the first insertion groove slant surface and the first stopper slant surface when the first keyboard stopper at the first auxiliary keyboard is engaged with the first stopper insertion groove at the body.

13. The mobile station of claim 11, wherein both sides, to a length direction, and an inner side, to a width direction, of the second stopper insertion groove at the first auxiliary keyboard merge inwardly to the direction getting far from the first auxiliary keyboard so as to form a second insertion groove slant surface and both sides, to the length direction, and an inner side, to the width direction, of the second keyboard stopper at the second auxiliary keyboard become wider outwardly to the direction getting far from the second auxiliary keyboard so as to form a second stopper slant surface, and wherein the second auxiliary keyboard is locked into the first auxiliary keyboard by the second insertion groove slant surface and the second stopper slant surface when the second keyboard stopper at the second auxiliary keyboard is engaged with the second stopper insertion groove at the first auxiliary keyboard.

14. The mobile station of claim 2, wherein a second body stopper is formed at a portion of the lower surface of the body confronting diagonally the hinge-jointed part to the first auxiliary keyboard and leaving slightly an interval from the boundary of the lower surface, wherein a partial front surface of the first auxiliary keyboard is caught by the inner surface of the second body stopper so as not to be move rotationally to the folding direction when the first auxiliary keyboard is completely folded into the body, wherein a third keyboard stopper is formed at a portion of the upper surface of the second auxiliary keyboard confronting the hinge-jointed part to a length direction, and wherein the third keyboard stopper at the second auxiliary keyboard is caught by the external surface of the second body stopper so as not to be move rotationally to the folding direction when the second auxiliary keyboard is completely folded into the body.

15. The mobile station of claim 14, wherein an inner side, to a width direction, of the second keyboard stopper at the body becomes wider outwardly to the direction getting far from the body so as to form a third stopper slant surface, wherein a front portion of the first auxiliary keyboard, which confronts the second body stopper, merges inwardly to the direction getting far from the body when the first auxiliary keyboard is folded so as to form a third keyboard slant surface, and wherein the first auxiliary keyboard is locked into the body by the third keyboard slant surface and the third stopper slant surface so as not to be displaced to the direction getting far from the body when being folded completely.

16. The mobile station of claim 14, wherein an external surface, to a width direction, or the second keyboard stopper at the body 1 becomes wider outwardly to the direction getting far from the body so as to form a fourth stopper slant surface, wherein an inner surface of the third keyboard stopper at the second auxiliary keyboard becomes wider outwardly to the direction getting far from the second auxiliary keyboard so as to form a fifth stopper slant surface, and wherein the second auxiliary keyboard 9 is locked into the body 1 by the fourth and fifth stopper slant surface so as not to be displaced to the direction getting far from the body when being folded completely.

17. The mobile station of claim 14, wherein the second body stopper is formed to be as high as the thickness of the first or second auxiliary keyboard so as to make second body stopper be contacted together with a support surface when unfolding the first and second auxiliary keyboards to be contacted with the support surface.

18. The mobile station of claim 2, wherein the first and second auxiliary keyboards move together so that, if one of the first and second auxiliary keyboards is unfolded, the rest is unfolded simultaneously as well.

19. The mobile station of claim 18, wherein a through-connection hole is formed through a partition wall separating a first insertion hollow formed in a body from a signal processing region part installed inside the body for the through-connection horizontally within a predetermined angle range, a fixed link is formed at an external circumference of the first insertion pipe of the first auxiliary keyboard so as to be exposed to the signal processing region part in the body through the through-connection hole, one guide cam, which is formed next to the signal processing region part in the body, of the respective guide cams is formed in the second insertion hollow of the body so as to be through-connected to the signal processing region part in the body, one guide protrusion, which is inserted into the guide cam next to the signal processing region part in the body, of a pair of the guide protrusions at the second insertion pipe of the second auxiliary keyboard extends to be exposed to the signal processing region part in the body, and both ends of a connection link are hinge-jointed to an end of the fixed link at the first insertion pipe exposed to the signal processing region part inside the body and one end of the guide protrusion at the second insertion pipe to be exposed to the signal processing region part in the body.

20. The mobile station of claim 1, wherein signals produced by selecting the first and second auxiliary input keys on the surfaces of the first and second auxiliary keyboards are transferred to the body through a plurality of signal wires, wherein, considering the rotary movement of the first and second auxiliary keyboards, the signal wires are placed in a space part in the middle of the hinge-jointed parts of the first and second auxiliary keyboards as a coiled form, and wherein one ends of the signal wires are connected to the signal processing region part in the body and the other ends of the signal wires are connected to the other signal processing region part in the first and second auxiliary keyboards.

21. The mobile station of claim 1, wherein a plurality of support cams are formed between the respective guide cams at the circumference of the second insertion hollow of the body so as to maintain a same slope degree of a slant part of the guide cam, wherein a plurality of support protusion are formed at the external circumferential surface of the second insertion pipe of the second auxiliary keyboard so as to maintain a same slope of the support cam, and wherein the body is supported stably after the second auxiliary keyboard has moved upwardly toward the body by making the respective support protrusions to be inserted into the support cam when the second auxiliary keyboard rotates to move toward the body.

22. The mobile station of claim 1, further comprising:
 a sensor detecting whether first and second auxiliary keyboards are folded or unfolded; and
 a microcomputer controlling signals of the respective auxiliary input keys so as to ignore the signals if the first and second auxiliary keyboards are judged as folded.

* * * * *